E. FLAHERTY & C. WARRILOW.
NUT LOCK FOR BEARINGS.
APPLICATION FILED JULY 19, 1913.
1,113,209.
Patented Oct. 13, 1914.
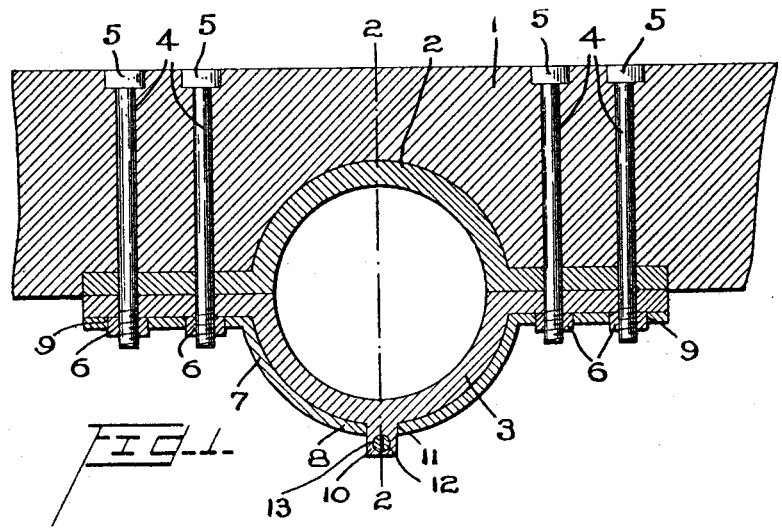
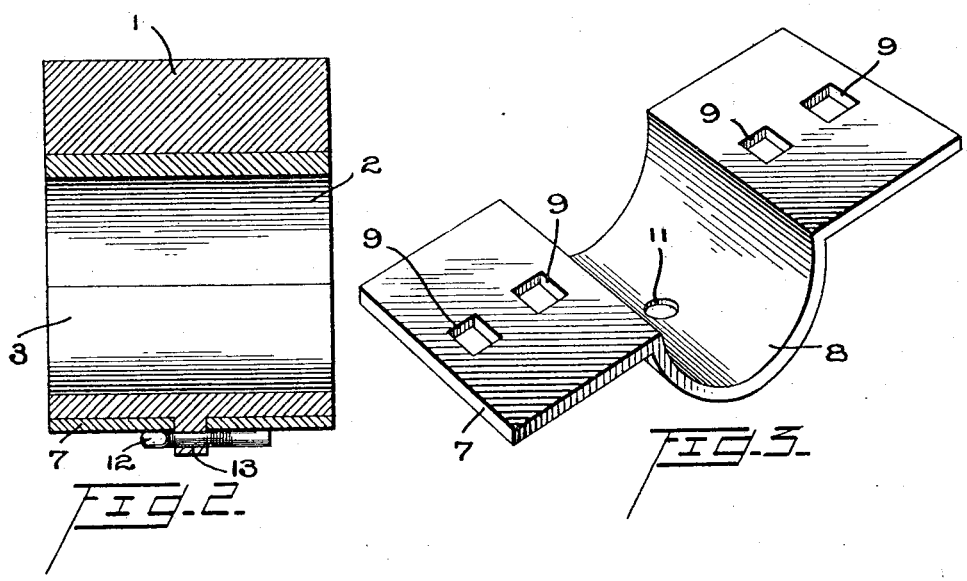
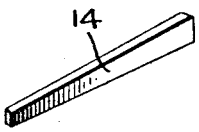
WITNESSES:
INVENTORS
Edward Flaherty,
and Charles Warrilow.
BY
Joshua R. H. Potts.
ATTORNEY

UNITED STATES PATENT OFFICE.

EDWARD FLAHERTY, OF MOREA COLLIERY, AND CHARLES WARRILOW, OF HAZLETON HEIGHTS, PENNSYLVANIA.

NUT-LOCK FOR BEARINGS.

1,113,209. Specification of Letters Patent. Patented Oct. 13, 1914.

Application filed July 19, 1913. Serial No. 779,920.

*To all whom it may concern:*

Be it known that we, EDWARD FLAHERTY and CHARLES WARRILOW, citizens of the United States, residing at Morea Colliery, county of Schuylkill, and State of Pennsylvania, and Hazleton Heights, county of Luzerne, and State of Pennsylvania, have invented certain new and useful Improvements in Nut-Locks for Bearings, of which the following is a specification.

Our invention relates to improvements in nut locks for bearings and more particularly to improved nut locking means for bearings such as are ordinarily employed as car pedestals and the like in which the nuts clamping the lower half bearing are secured against possibility of working loose.

A further object is to provide improvements of this character which securely hold a plurality of nuts and which is effectually secured to the bearing.

With these and other objects in view, the invention consists in certain novel features of construction and combinations and arrangements of parts as will be more fully hereinafter described and pointed out in the claim.

In the accompanying drawings: Figure 1 is a view in longitudinal section illustrating our improvements. Fig. 2 is a view in section on the line 2—2 of Fig. 1. Fig. 3 is a perspective view of the nut locking member detached, and Fig. 4 is a perspective view illustrating a wedge key.

1 represents a section of car frame and 2 the upper half bearing member for the car axle (not shown).

3 is the lower removable half bearing member which is clamped to member 2 and to support 1 by bolts 4 having heads 5 at their upper ends and nuts 6 at their lower ends. This is a conventional type of car bearing or pedestal, and in connection with which we employ our improved nut lock which consists of a plate 7 having a semicircular intermediate portion 8 to fit the lower half bearing member 3, and the ends of said plate are extended in opposite directions and provided with angular openings 9 conforming in shape to the shape of the nuts 6. The plate 7 conforms in shape to the shape of the lower half bearing member 3, and is adapted to be positioned against the same with the nuts 6 in openings 9 preventing any turning movement of the nuts. A lug 10 is made integral with the lower half bearing member 3 and projects through an opening 11 in the curved portion 8. A cotter pin 12 may be projected through an opening 13 in the lug 10 and effectually secure the nut locking plate in position. Instead of the cotter pin 12, we may employ a wedge key 14 as shown in Fig. 4.

In operation, after the nuts 6 are screwed home, the nut locking plate 7 is positioned against the lower bearing member 3 with the nuts 6 in the openings 9, and the plate 7 secured by means of the cotter pin 12 or wedge key 14. When in this position, the nuts will be prevented from rotary movement, and hence cannot work loose due to vibrations and jars.

While we have illustrated our improvements in connection with two nuts at each side of the bearing, we would have it understood that the invention is not limited to any particular number of nuts, and various slight changes might be made in the general form and arrangement of parts described without departing from our invention, and hence we do not limit ourselves to the precise details set forth, but consider ourselves at liberty to make such changes and alterations as fairly fall within the spirit and scope of the appended claim.

Having thus described our invention, what we claim as new and desire to secure by Letters Patent is:

The combination of two half bearings of semi-cylindrical form, having perforated extensions at their ends, bolts projected through said extensions, and nuts on the lower ends of the bolts, of a plate having a curved intermediate portion and straight ends, said plate snugly fitting the lower half bearing and having angular openings receiving the nuts, said plate at the center of its curved portion having an opening therein, a perforated lug integral with the lower half bearing and projecting through the opening in the plate, and a cross pin projected through the perforated lug, substantially as described.

In testimony whereof we have signed our names to this specification in the presence of two subscribing witnesses.

EDWARD FLAHERTY.
CHARLES WARRILOW.

Witnesses:
W<small>M</small>. C. JAMES,
S. C. SAMUELS.

Copies of this patent may be obtained for five cents each, by addressing the "Commissioner of Patents, Washington, D. C."